United States Patent
Nash

(10) Patent No.: US 11,662,139 B2
(45) Date of Patent: May 30, 2023

(54) REFRIGERATED CARGO CONTAINER CARGO SENSOR

(71) Applicant: Carrier Corporation, Palm Beach Gardens, FL (US)

(72) Inventor: James Nash, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 123 days.

(21) Appl. No.: 17/056,959

(22) PCT Filed: Jul. 16, 2019

(86) PCT No.: PCT/US2019/042015
§ 371 (c)(1),
(2) Date: Nov. 19, 2020

(87) PCT Pub. No.: WO2020/018543
PCT Pub. Date: Jan. 23, 2020

(65) Prior Publication Data
US 2021/0215418 A1  Jul. 15, 2021

Related U.S. Application Data

(60) Provisional application No. 62/699,383, filed on Jul. 17, 2018.

(51) Int. Cl.
  *F25D 29/00* (2006.01)
  *F25D 11/00* (2006.01)
  *F25D 21/08* (2006.01)

(52) U.S. Cl.
  CPC .......... *F25D 29/003* (2013.01); *F25D 11/003* (2013.01); *F25D 21/08* (2013.01);
  (Continued)

(58) Field of Classification Search
  CPC ...... F25D 29/003; F25D 11/003; F25D 21/08; F25D 29/005; F25D 2700/06; F25D 2700/12
  See application file for complete search history.

(56) References Cited

U.S. PATENT DOCUMENTS

| | | |
|---|---|---|
| 3,802,212 A | 4/1974 | Martin et al. |
| 4,663,725 A | 5/1987 | Truckenbrod et al. |
| 4,808,009 A | 2/1989 | Sittler et al. |

(Continued)

FOREIGN PATENT DOCUMENTS

| | | |
|---|---|---|
| CN | 102472517 A | 5/2012 |
| CN | 204165320 U | 2/2015 |

(Continued)

OTHER PUBLICATIONS

International Search Report for International Application No. PCT/US2019/042015, International Filing Date: Jul. 16, 2019, dated Jan. 17, 2020, 8 pages.

(Continued)

*Primary Examiner* — Elizabeth J Martin
(74) *Attorney, Agent, or Firm* — Cantor Colburn LLP

(57) ABSTRACT

A cargo (22) detection system for a refrigerated cargo container (10) includes a cargo sensor (50) body configured to detect presence of cargo (22) in a refrigerated cargo container (10) and a sensor bracket (56) configured for securing the cargo sensor (50) body at a refrigeration unit (24) of the refrigerated cargo container (10). A temperature sensor (72) is located at the cargo sensor (50) body and is configured to detect a temperature of the cargo sensor (50) body. A temperature controller (74) is operably connected to the temperature sensor (72) and is configured to activate the cargo sensor (50) body for collection of data when the temperature of the cargo sensor (50) body is above a threshold.

11 Claims, 5 Drawing Sheets

(52) U.S. Cl.
CPC ........ *F25D 29/005* (2013.01); *F25D 2700/06* (2013.01); *F25D 2700/12* (2013.01)

(56) References Cited

U.S. PATENT DOCUMENTS

| | | |
|---|---|---|
| 5,051,645 A | 9/1991 | Brace et al. |
| 5,123,252 A | 6/1992 | Hanson |
| 6,467,282 B1 | 10/2002 | French et al. |
| 6,609,388 B1 | 8/2003 | Hanson |
| 8,136,363 B2 | 3/2012 | Ludwig |
| 8,959,939 B2 | 2/2015 | Kim et al. |
| 9,513,046 B2 | 12/2016 | Ramirez |
| 9,671,154 B1 | 6/2017 | Shrader et al. |
| 9,863,677 B2 | 1/2018 | Yoshikawa et al. |
| 2003/0155467 A1 | 8/2003 | Petrenko |
| 2003/0202557 A1 | 10/2003 | Hanson et al. |
| 2006/0042296 A1 | 3/2006 | Ludwig et al. |
| 2009/0255279 A1 | 10/2009 | Kim et al. |
| 2010/0024452 A1 | 2/2010 | Lifson et al. |
| 2013/0081415 A1 | 4/2013 | Kim et al. |
| 2013/0138251 A1 | 5/2013 | Thoegersen et al. |
| 2014/0379141 A1 | 12/2014 | Patil et al. |
| 2016/0016459 A1 | 1/2016 | Hamamoto et al. |
| 2017/0184333 A1 | 6/2017 | Lukasse |
| 2017/0274732 A1 | 9/2017 | Galansky et al. |
| 2019/0105964 A1* | 4/2019 | Yasar ................. B60H 1/00657 |

FOREIGN PATENT DOCUMENTS

| | | |
|---|---|---|
| CN | 104515266 A | 4/2015 |
| CN | 204675153 U | 9/2015 |
| CN | 205403311 U | 7/2016 |
| CN | 206073549 U | 4/2017 |
| CN | 206300407 U | 7/2017 |
| CN | 105135791 B | 10/2017 |
| CN | 206664203 U | 11/2017 |
| CN | 107543649 A | 1/2018 |
| CN | 107655084 A | 2/2018 |
| CN | 107667267 A | 2/2018 |
| CN | 107966532 A | 4/2018 |
| CN | 108195119 A | 6/2018 |
| DE | 4115891 A1 | 11/1991 |
| EP | 0318420 A1 | 5/1989 |
| EP | 2578970 A2 | 4/2013 |
| GB | 801746 | 9/1958 |
| JP | 2005127615 A | 5/2005 |
| JP | 2017062050 A | 3/2017 |
| KR | 2005099887 A | 10/2005 |
| WO | 2016062535 A1 | 4/2016 |
| WO | 2017105983 A1 | 6/2017 |
| WO | 2017165518 A1 | 9/2017 |

OTHER PUBLICATIONS

Written Opinion for International Application No. PCT/US2019/042015, International Filing Date: Jul. 16, 2019, dated Jan. 17, 2020, 13 pages.

International Preliminary Report on Patentability & Written Opinion; International Application No. PCT/US2019/042015; International Filing Date Jul. 16, 2019; dated Jan. 28, 2021; 13 pages.

* cited by examiner

REFRIGERATED CARGO CONTAINER CARGO SENSOR

CROSS REFERENCE TO RELATED APPLICATIONS

This application is a National Stage application of PCT/US2019/042015, filed Jul. 16, 2019, which claims the benefit of Provisional Application No. 62/699,383 filed Jul. 17, 2018, the disclosures of which are incorporated herein by reference in their entirety.

BACKGROUND

Exemplary embodiments pertain to the art of refrigeration systems. More specifically, the subject matter disclosed herein relates to refrigeration of truck cargo compartments utilized to store and ship cargo.

A typical refrigerated cargo container or refrigerated truck trailer, such as those utilized to transport a cargo via sea, rail or road, is a container modified to include a refrigeration unit located at one end of the container. The refrigeration unit includes a compressor, condenser, expansion valve and evaporator serially connected by refrigerant lines in a closed refrigerant circuit in accord with known refrigerant vapor compression cycles. The evaporator is located at least partially in a compartment that requires cooling, such as a cargo compartment of a truck or trailer. The condenser and compressor are located outside of the compartment. Cargo compartment air is passed over the coils of the evaporator, boiling the refrigerant flowing through the evaporator coil, thus heat is absorbed from the air in the conditioned compartment to cool the conditioned compartment. The gaseous refrigerant is then flowed to the compressor for compression thereat. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, the engine drives a generator that generates electrical power, which in turn drives the compressor.

In a typical transport refrigeration units, one or more cargo sensors may be located in the cargo compartment to detect the presence of cargo in the compartment. In some applications, the usefulness of such sensors is limited because frost or ice particles accumulate on the sensors due to the low-temperature conditions in the cargo compartment. When ice accumulates on the sensor, the sensor may become inoperable, or alternatively may merely detect the ice accumulation, giving a false positive indication of the presence of cargo in the cargo compartment.

BRIEF DESCRIPTION

In one embodiment, a cargo detection system for a refrigerated cargo container includes a cargo sensor body configured to detect presence of cargo in a refrigerated cargo container and a sensor bracket configured for securing the cargo sensor body at a refrigeration unit of the refrigerated cargo container. A temperature sensor is located at the cargo sensor body and is configured to detect a temperature of the cargo sensor body. A temperature controller is operably connected to the temperature sensor and is configured to activate the cargo sensor body for collection of data when the temperature of the cargo sensor body is above a threshold.

Additionally or alternatively, in this or other embodiments the threshold is zero degrees Celsius.

Additionally or alternatively, in this or other embodiments the sensor bracket includes a bracket base at which the cargo sensor body is secured and a plurality of bracket legs extending from the bracket base to at least partially define an air gap between the sensor bracket and the refrigeration unit when the sensor bracket is installed thereto.

Additionally or alternatively, in this or other embodiments the sensor bracket and the cargo sensor body are formed as a unitary element.

Additionally or alternatively, in this or other embodiments the cargo sensor body includes an infrared sensor.

Additionally or alternatively, in this or other embodiments the sensor bracket includes a bracket opening configured to improve air flow to the cargo sensor body.

In another embodiment, a refrigeration assembly for a refrigerated cargo container includes a refrigeration unit having an evaporator, a defroster heater configured to defrost the evaporator, and a cargo detection system secured to the refrigeration unit, including a cargo sensor. The defroster heater and the cargo sensor are located such that activation of the defroster heater increases a temperature of the cargo sensor.

Additionally or alternatively, in this or other embodiments a temperature sensor is located at the cargo sensor and is configured to detect the temperature of the cargo sensor, and a temperature controller is operably connected to the temperature sensor and is configured to activate the cargo sensor for collection of data when the temperature of the cargo sensor is above a threshold.

Additionally or alternatively, in this or other embodiments the threshold is zero degrees Celsius.

Additionally or alternatively, in this or other embodiments the cargo sensor is located above the defroster heater.

Additionally or alternatively, in this or other embodiments the cargo sensor includes a cargo sensor body configured to detect presence of cargo in a refrigerated cargo container and a sensor bracket configured for securing the cargo sensor body at the refrigeration unit;

Additionally or alternatively, in this or other embodiments the sensor bracket includes a bracket base at which the cargo sensor body is secured and a plurality of bracket legs extending from the bracket base to at least partially define an air gap between the sensor bracket and the refrigeration unit when the sensor bracket is installed thereto.

Additionally or alternatively, in this or other embodiments the sensor bracket and the cargo sensor body are formed as a unitary element.

Additionally or alternatively, in this or other embodiments the sensor bracket includes a bracket opening configured to improve air flow to the cargo sensor body.

Additionally or alternatively, in this or other embodiments the cargo sensor includes an infrared sensor.

In yet another embodiment a refrigerated cargo container includes a cargo container, and a refrigeration unit, including an evaporator, a defroster heater configured to defrost the evaporator, and a cargo detection system secured to the refrigeration unit. The cargo detection system includes a cargo sensor, wherein the defroster heater and the cargo sensor are located such that activation of the defroster heater increases a temperature of the cargo sensor.

Additionally or alternatively, in this or other embodiments a temperature sensor is located at the cargo sensor and is configured to detect the temperature of the cargo sensor, and a temperature controller is operably connected to the temperature sensor and is configured to activate the cargo sensor for collection of data when the temperature of the cargo sensor is above a threshold.

Additionally or alternatively, in this or other embodiments the cargo sensor is located between the defroster heater and a ceiling of the cargo container.

Additionally or alternatively, in this or other embodiments the cargo sensor includes a cargo sensor body configured to detect presence of cargo in a refrigerated cargo container, and a sensor bracket configured for securing the cargo sensor body at the refrigeration unit.

Additionally or alternatively, in this or other embodiments the sensor bracket includes a bracket base at which the cargo sensor body is secured, and a plurality of bracket legs extending from the bracket base to at least partially define an air gap between the sensor bracket and the refrigeration unit when the sensor bracket is installed thereto.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
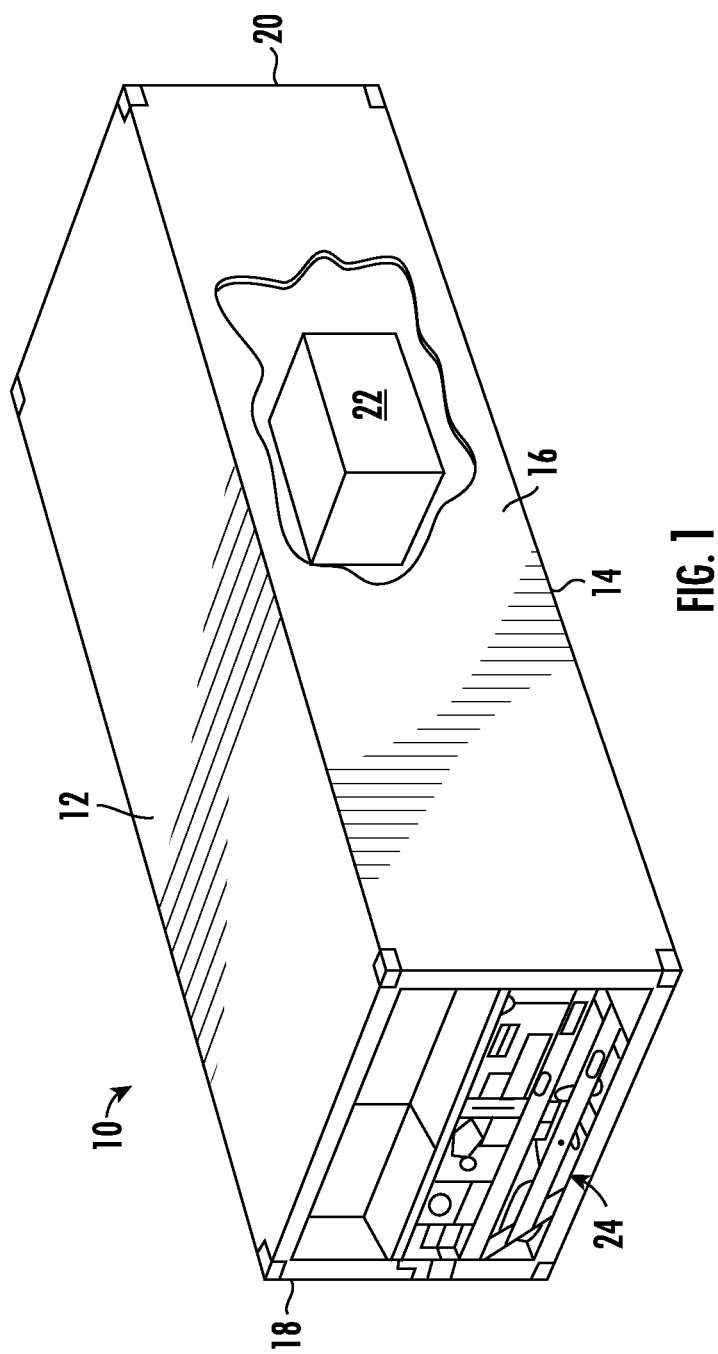
FIG. 1 is a schematic illustration of an embodiment of a refrigerated transportation cargo container.

Shown in FIG. 1 is an embodiment of a refrigerated cargo container 10. The cargo container 10 is formed into a generally rectangular construction, with a ceiling 12, a directly opposed floor 14, opposed side walls 16 and a front wall 18. The cargo container 10 further includes a door or doors (not shown) at a rear wall 20, opposite the front wall 18. The cargo container 10 is configured to maintain a cargo 22 located inside the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes a compressor 26, a condenser 28, an expansion valve 30, an evaporator 32 and an evaporator fan 34 (shown in FIG. 2), as well as other ancillary components.

Figure 2:
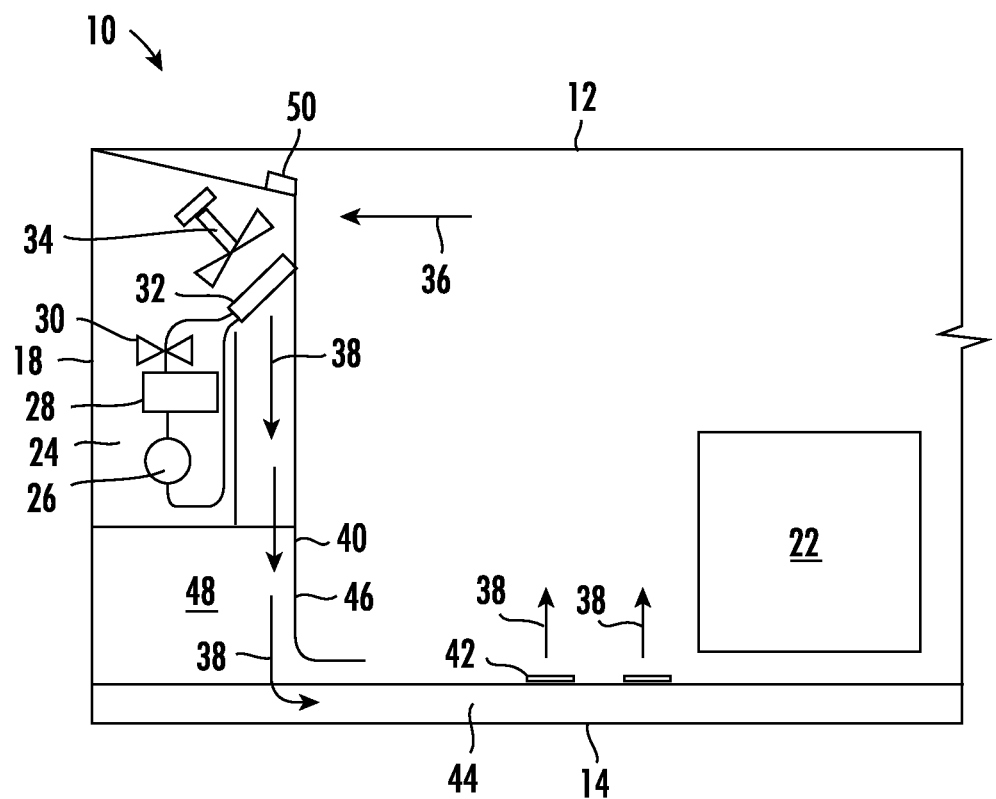
FIG. 2 is another schematic illustration of an embodiment of a refrigerated transportation cargo container.

Referring to FIG. 2, the refrigeration unit 24 blows return airflow 36 across the evaporator 32 via the evaporator fan 34, thus cooling the airflow 36 to a selected temperature and urges the cooled return airflow 36, now referred to as supply air 38, through a kick plate assembly 40 into the container 10 via, for example, openings 42 in one or more T-bars 44 extending along the floor 14 of the container 10 to cool the cargo 22. As shown in FIG. 2, the kick plate assembly 40 includes a kick plate 46 that forms a discharge cavity 48 at a bottom portion of the refrigeration unit 24 to evenly distribute the supply air 38 along a width of the cargo container 10 into the T-bars 44. In some embodiments, the kick plate assembly 40 and the discharge cavity 48 are located below the refrigeration unit 24, between the refrigeration unit 24 and the floor 14 of the cargo container 10.

Figure 3:
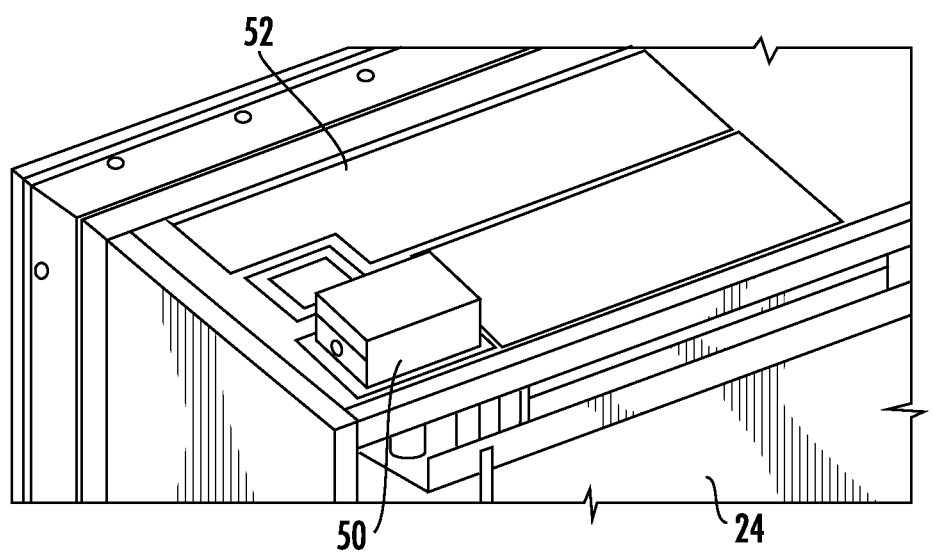
FIG. 3 is a perspective view of a cargo sensor located at a refrigeration unit.

A cargo sensor 50 is located in the container 10 and is located and configured to detect presence of the cargo 22 in the container 10. The cargo sensor 50 is, in one embodiment, a non-contact infrared sensor, but in other embodiments other types of sensors may be utilized. Referring now to FIG. 3, the refrigeration unit 24 must be periodically defrosted to maintain performance of the refrigeration unit 24. In some embodiments, the refrigeration unit 24 is automatically defrosted in the range of every 8-24 hours during operation of the container 10. In one embodiment, the refrigeration unit 24 is defrosted every 18 hours. Further, the refrigeration unit 24 may be defrosted at other time intervals or on demand via manual initiation of the defrosting operation. As such, the refrigeration unit 24 includes a defrosting heater 52, located to defrost the evaporator 32 and other components of the refrigeration unit 24. In some embodiments, the defrosting heater 52 is located at or near a top end 54 of the refrigeration unit 24. As shown in FIG. 3, the cargo sensor 50 is located at the refrigeration unit 24 above the defrosting heater 52. In some embodiments, cargo sensor 50 is located between the defrosting heater 52 and the ceiling 12 (shown best in FIG. 2) of the container 10. Location of the cargo sensor 50 above the defrosting heater 52 allows the cargo sensor 50 to take advantage of heat generated by the defrosting heater 52 during a defrosting operation to reduce any ice accumulation at the cargo sensor 50.

Figure 4:
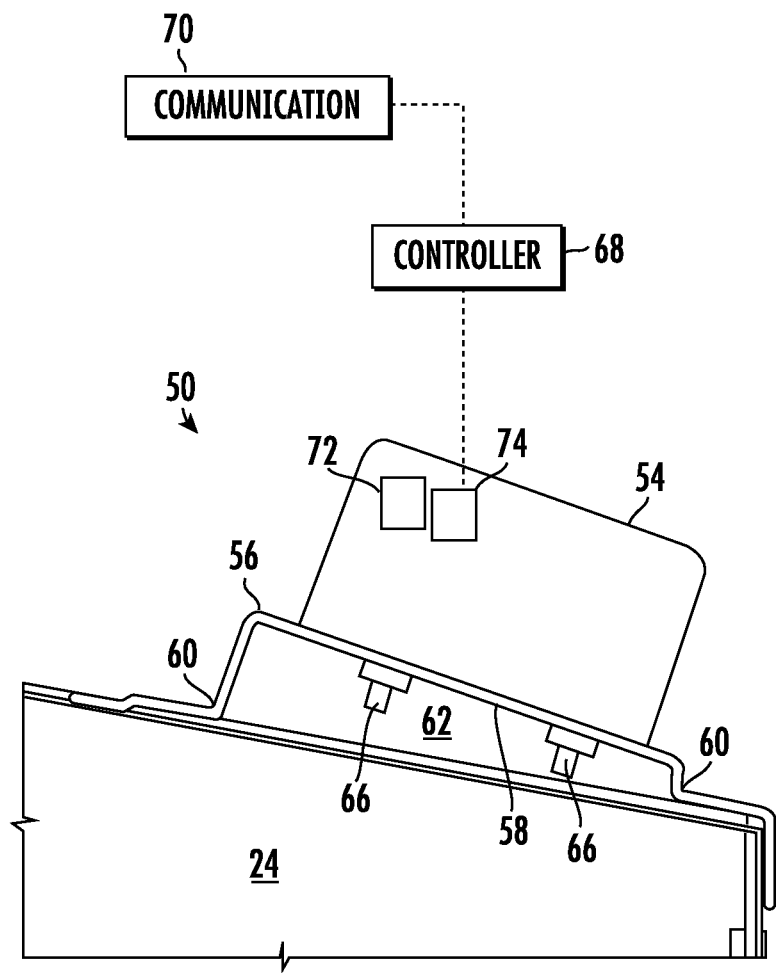
FIG. 4 is a side view of a cargo sensor located at a refrigeration unit.

Referring to FIG. 4, shown is an embodiment of a cargo sensor 50, which includes features to improve heat circulation around the cargo sensor 50 and therefore improve removal of accumulated ice during operation of the defrosting heater 52. The cargo sensor 50 includes a sensor body 54 and a sensor bracket 56 to which the sensor body 54 is mounted. The sensor bracket 56 supports the sensor body 54 and is utilized to mount the cargo sensor 50 at the refrigeration unit 24.

Figure 5:
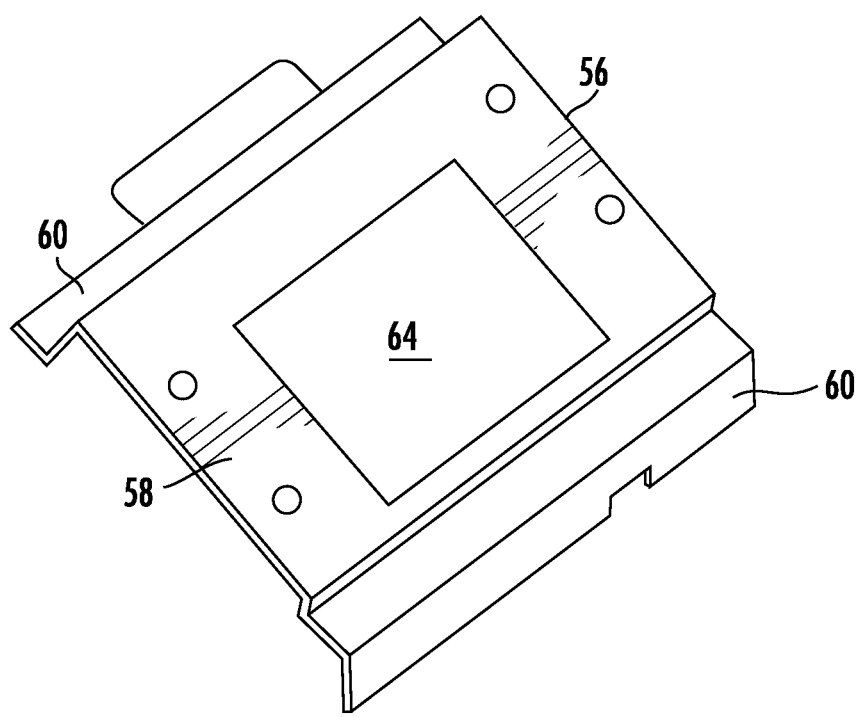
FIG. 5 is a perspective view of an embodiment of a cargo sensor bracket.

The sensor bracket 56 includes a base portion 58 and one or more bracket legs 60 extending from the base portion 58. The bracket legs 60 extend downwardly from the base portion 58 such that when installed to the refrigeration unit 24, the base portion 58 is offset from the refrigeration unit 24 and defines an air gap 62 between the refrigeration unit 24 and the cargo sensor 50 to improve air circulation around the cargo sensor 50 for improved defrost performance when the defrosting heater 52 is operating. Referring to FIG. 5, in some embodiments the base portion 58 has a base opening 64 such that the sensor body 54 is directly exposed to airflow through the air gap 62 to further improve defrost performance of the cargo sensor 50.

Referring again to FIG. 4, in some embodiments the sensor body 54 is mounted to the sensor bracket 56 at the base portion 58 via a plurality of bolts 66. Utilizing the plurality of bolts 66 is merely exemplary, however, and one skilled in the art will readily appreciate that other elements to secure the sensor body 54 to the sensor bracket 56 may be utilized, such as, for example, screws, snaps, clips. In another embodiment, the sensor bracket 56 and the sensor body 54 are formed as a unitary structure, with the sensor bracket 56 formed integral with the sensor body 54.

When installed in the container 10, the cargo sensor 50 is operably connected to a refrigeration unit control system 68 and to a communication system 70, which outputs a status of the cargo 22 to, for example, a container operator or a cargo owner. The cargo sensor 50 further includes a temperature sensor 72 and temperature controller 74. In operation, when the temperature sensor 72 detects a temperature at or below 0 degrees Celsius the temperature controller 74 signals the cargo sensor to stop collection of data, thus preventing false or errant data from being collected and transmitted. When the temperature sensor 72 detects a temperature at the cargo sensor 50 of over 0 degrees Celsius on the other hand, the cargo sensor 50 will periodically detect the presence of the cargo 22 and transmit data indicating the presence of the cargo to the refrigeration unit control system 68, which in turn transmits the data via the communication system 70. In some embodiments, the cargo sensor 50 detects the cargo 22 at regular intervals such as, for example, every 12 hours. The interval may be adjusted as desired via software.

Location of the cargo sensor 50 in proximity to the defrosting heater 52, improves performance of the cargo sensor 50 by reducing or eliminating ice accumulation on the cargo sensor 50, thereby improving performance of the cargo sensor 50. Further, the addition of the temperature sensor 72 and temperature controller 74 at the cargo sensor 50 prevents false or errant data from being collected and transmitted.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cargo detection system for a refrigerated cargo container, comprising:
    a cargo sensor body configured to detect presence of cargo in the refrigerated cargo container;
    a sensor bracket configured for securing the cargo sensor body at a refrigeration unit of the refrigerated cargo container;
    a temperature sensor disposed at the cargo sensor body configured to detect a temperature of the cargo sensor body; and
    a temperature controller operably connected to the temperature sensor and configured to activate the cargo sensor body for collection of data when the temperature of the cargo sensor body is above a threshold.

2. The cargo detection system of claim 1, wherein the threshold is zero degrees Celsius.

3. The cargo detection system of claim 1, wherein the sensor bracket includes:
    a bracket base at which the cargo sensor body is secured; and
    a plurality of bracket legs extending from the bracket base to at least partially define an air gap between the sensor bracket and the refrigeration unit when the sensor bracket is installed thereto.

4. The cargo detection system of claim 1, wherein the sensor bracket and the cargo sensor body are formed as a unitary element.

5. The cargo detection system of claim 1, wherein the cargo sensor body comprises an infrared sensor.

6. The cargo detection system of claim 1, wherein the sensor bracket includes a bracket opening configured to improve air flow to the cargo sensor body.

7. A refrigeration assembly for the refrigerated cargo container, comprising:
    a refrigeration unit, including:
        an evaporator;
        a defroster heater configured to defrost the evaporator; and
    the cargo detection system as in claim 1 secured to the refrigeration unit;
    wherein the defroster heater and the cargo sensor are disposed such that activation of the defroster heater increases a temperature of the cargo sensor.

8. The refrigeration assembly of claim 7, wherein the cargo sensor is disposed above the defroster heater.

9. The refrigeration assembly of claim 7, wherein the sensor bracket includes a bracket opening configured to improve air flow to the cargo sensor body.

10. A refrigerated cargo container, comprising:
    a refrigeration unit, including:
        an evaporator;
        a defroster heater configured to defrost the evaporator; and
    the cargo detection system as in claim 1 secured to the refrigeration unit;
    wherein the defroster heater and the cargo sensor are disposed such that activation of the defroster heater increases a temperature of the cargo sensor.

11. The refrigerated cargo container of claim 10, wherein the cargo sensor is disposed between the defroster heater and a ceiling of the refrigerated cargo container.

* * * * *